L. BROWN.
LAWN MOWER.
APPLICATION FILED SEPT. 20, 1915.
1,202,963.
Patented Oct. 31, 1916.
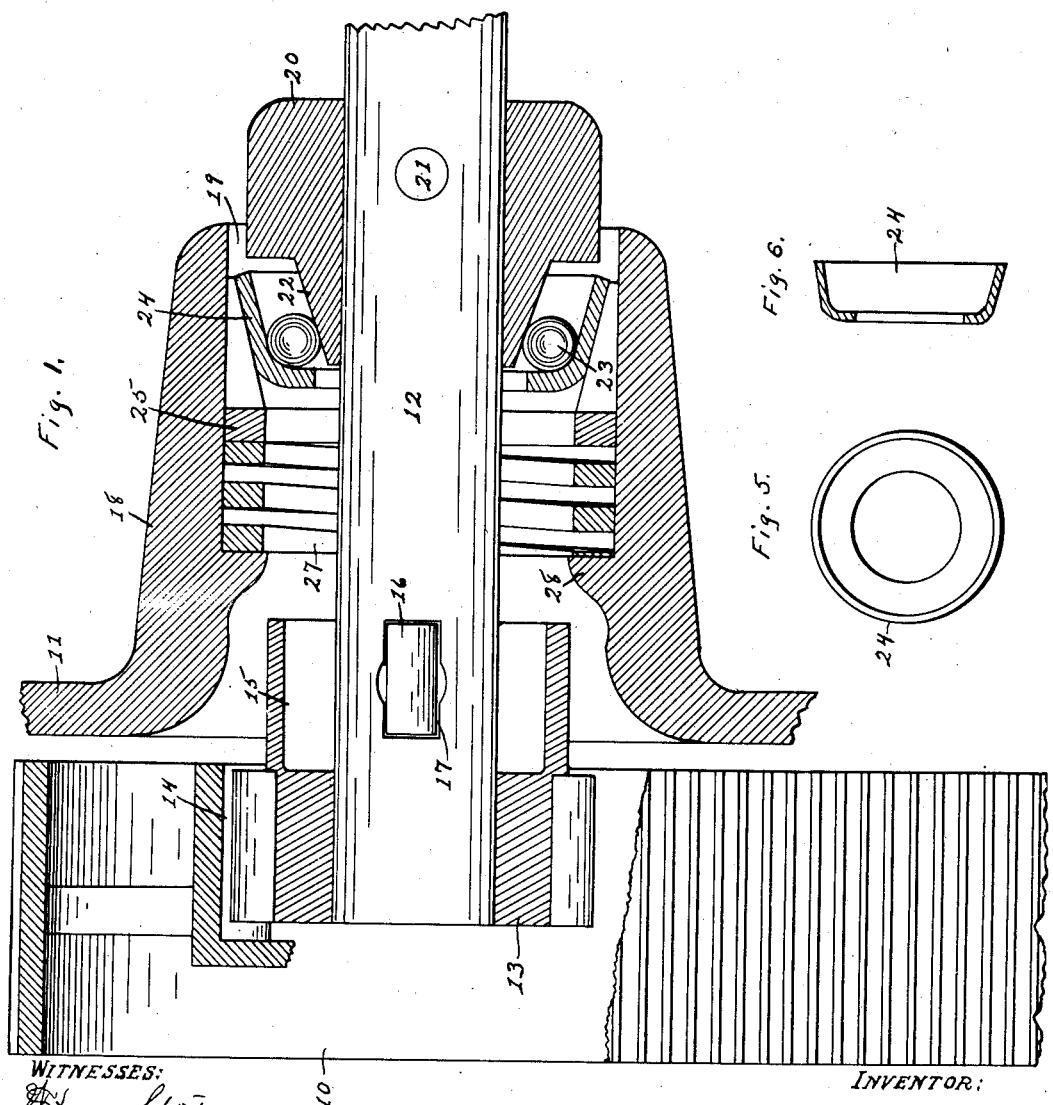
INVENTOR:
LEVI BROWN
By Earl M. Sinclair
Atty.

UNITED STATES PATENT OFFICE.

LEVI BROWN, OF VALLEY JUNCTION, WISCONSIN, ASSIGNOR TO CLARINDA LAWN MOWER COMPANY, OF CLARINDA, IOWA, A CORPORATION OF IOWA.

LAWN-MOWER.

1,202,963.   Specification of Letters Patent.   Patented Oct. 31, 1916.

Application filed September 20, 1915. Serial No. 51,658.

*To all whom it may concern:*

Be it known that I, LEVI BROWN, citizen of the United States of America, and resident of Valley Junction, Monroe county, Wisconsin, have invented a new and useful Improvement in Lawn-Mowers, of which the following is a specification.

The object of this invention is to provide an improved construction and arrangement for the ball-bearing devices of a lawn mower in which a light running machine is secured and the proper relation of the cutting reel to the stationary blade is automatically maintained at all times.

A further object of this invention is to provide a simple, cheap and efficient construction for a self-adjusting ball device.

My invention consists in the construction, arrangement and combination of elements hereinafter set forth, pointed out in my claims and illustrated by the accompanying drawing, in which—

Figure 1 is a section of a portion of a lawn mower equipped with my improvements. Fig. 2 is an inner face view, Fig. 3 a side elevation, and Fig. 4 a central section, of a split annular wedge employed in the construction. Fig. 5 is an inner face view, and Fig. 6 a central section, of a ball cup employed. Figs. 2 to 6 inclusive are on a scale reduced relative to Fig. 1.

In the construction of the devices as shown the numeral 10 designates one of the ground wheels of a lawn mower of any desired construction, and 11 designates generally one of the side frames carried thereby, only a small portion of these members being here shown to indicate the relation of the other parts thereto. The numeral 12 indicates the reel shaft, carrying a rotary reel of common form (not shown), and loosely mounted on the end of said shaft is a pinion 13 in mesh with and adapted to be driven by an internal gear 14 carried by the ground wheel 10. An internal ratchet member 15 is fixed to the pinion 13 concentrically of the shaft 12 and is adapted to engage a flat pawl 16 mounted loosely through an aperture 17 in said shaft, in a common manner, whereby the reel shaft and reel are rotated only when the ground wheel 10 is moving forwardly.

The side frame 11 is formed with an inwardly projecting integral hub 18, and said hub is formed with an inwardly opening cylindrical recess 19 concentric with the reel shaft 12. A bearing member 20 is mounted on and fixed to the shaft 12 by means of a pin 21, and said bearing member is formed on its outer end with a cone-shaped bearing surface 22, adapted to support an annular row of bearing balls 23. An annular ball cup 24 is formed with a central aperture loosely surrounding the shaft 12, and said cup is so arranged as to embrace the bearing balls 23 and cone surface 22 of the bearing member 20. An annular wedge-shaped adjusting member 25 is mounted concentrically of the shaft 12 and also of the ball cup 24, and the taper of said wedge member corresponds to the taper of the outside surface of said cup. The wedge member 25 is formed with a plurality of spaced slots 26 in its wedge portion, and the outer surface of the wedge is cylindrical and fits snugly within the cylindrical recess 19. An expansive coil spring 27 is mounted within the recess 19 and impinges at one end the wedge member 25 and at its opposite end an internal shoulder or flange 28 formed in the hub 18 at the base of said recess.

In practical use, in the event of wear of the parts, or of movement of the side frames 10 of the machine relative to each other, so as to disturb the relative positions of the rotary reel and stationary blade, the spring 27 will act to compensate for such movement or wear by pressure on the wedge member 25, which in turn acts to move the ball cup 24 and balls 23, relative to the bearing member 20. When the proper amount of adjustment has been accomplished to so compensate, the contact of the outer surface of the cup 24 with the inner face of the wedge member 25, will cause the split wedge member to expand and frictionally engage the inner face of the cylindrical recess 19, whereupon the movement is caused to cease. Thus at all times the desired adjustment is automatically maintained, so as to maintain the proper relations of the cutting knives; and this is done without friction or strain on the bearing elements, as the action of the spring is cut off by the expansion of the wedge member 25 as soon as the adjustment is accomplished. A cheap and relatively light spring may thus be employed, as it is not constantly under tension, and the light running qualities of the machine are materially increased.

I claim as my invention—

1. In a machine of the class described, the combination of a frame formed with a hub, a shaft mounted for rotation and concentric of said hub, a bearing member fixed to said shaft, a bearing member loosely mounted on said shaft and coöperating with said fixed bearing member, a split wedge contacting with the loose bearing member and the inner face of said hub, and a spring arranged to move said wedge toward said loose bearing member.

2. In a machine of the class described, the combination of a frame formed with a hub, a shaft mounted for rotation within and concentric with said hub, a cone bearing member fixed to said shaft, a cup bearing member loosely mounted on said shaft and coöperating with said cone bearing member, an annular wedge mounted concentrically of said shaft and cup bearing member and having its outer surface engaging the inner surface of said hub, said wedge being formed with a plurality of longitudinal slots, and a spring acting to move said wedge toward said cup bearing member.

3. In a machine of the class described, the combination of a frame formed with an inwardly extending hub having a cylindrical recess, a shaft mounted for rotation in the axis of said recess, a bearing member fixed to said shaft and formed with a cone-shaped outer end, a ball cup loosely mounted on said shaft, bearing balls between said cup and cone bearing member, an annular wedge mounted loosely on said shaft and engaging the outer surface of said ball cup, said wedge being split and engaging the inner surface of said recess, and a spring mounted between the base of said recess and the outer end of said wedge.

4. In a machine of the class described, the combination of a frame formed with a hub having a cylindrical recess, a shaft mounted for rotation in the axis of said recess, a bearing member fixed to said shaft and formed with a cone-shaped bearing surface, a ball cup loosely mounted on said shaft, bearing balls between said cup and cone bearing member, a split annular wedge mounted loosely on the shaft and engaging the outer surface of said cup, the taper of the wedge corresponding to that of the outer surface of the cup, said wedge having a cylindrical outer surface engaging the inner surface of the cylindrical recess, and yielding pressure devices acting between the frame and wedge to move said wedge and said cup toward said cone bearing member.

Signed by me at Valley Junction, Wisconsin, this 13th day of Sept., 1915.

LEVI BROWN.

Witnesses:
NELLIE HACKETT,
ARCHIE ACKERMAN.